(12) United States Patent
Kang et al.

(10) Patent No.: US 7,924,801 B2
(45) Date of Patent: Apr. 12, 2011

(54) APPARATUS AND METHOD FOR DETECTING PACKET IN WIRELESS LAN BASED ON ORTHOGONAL FREQUENCY DIVISION MULTIPLEXING

(75) Inventors: Hun-Sik Kang, Daejon (KR); Do-Young Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 985 days.

(21) Appl. No.: 11/646,954

(22) Filed: Dec. 28, 2006

(65) Prior Publication Data

US 2008/0080466 A1    Apr. 3, 2008

(30) Foreign Application Priority Data

Sep. 29, 2006 (KR) .................. 10-2006-0096170

(51) Int. Cl.
*H04J 1/00* (2006.01)
(52) U.S. Cl. ........ 370/343; 370/355; 370/207; 370/208; 370/209; 375/354; 375/260; 375/343
(58) Field of Classification Search .................. 375/343, 375/354, 355; 370/207, 208
See application file for complete search history.

(56) References Cited

U.S. PATENT DOCUMENTS

| | | | | |
|---|---|---|---|---|
| 6,650,718 B1 * | 11/2003 | Fujimura et al. | ............... | 375/355 |
| 6,754,292 B1 * | 6/2004 | Pulley et al. | .................. | 375/343 |
| 7,058,151 B1 * | 6/2006 | Kim | ............................. | 375/355 |
| 7,266,164 B2 * | 9/2007 | Jeon et al. | ...................... | 375/340 |
| 7,480,234 B1 * | 1/2009 | Hart et al. | ...................... | 370/208 |
| 2002/0191535 A1 * | 12/2002 | Sugiyama et al. | ............ | 370/208 |
| 2004/0170237 A1 | 9/2004 | Chadha et al. | | |
| 2005/0008088 A1 | 1/2005 | Liu et al. | | |
| 2005/0117674 A1 * | 6/2005 | Jeon et al. | ...................... | 375/342 |
| 2005/0190786 A1 | 9/2005 | Jones, IV et al. | | |
| 2006/0045137 A1 * | 3/2006 | Kim et al. | ...................... | 370/516 |

(Continued)

FOREIGN PATENT DOCUMENTS

JP        11-196062        7/1999

(Continued)

OTHER PUBLICATIONS

"Design and Implementation of Synchronization and AGC for OFDM-based WLAN Receivers." Victor P. Gil Jiménez et al. IEEE Transactions on Consumer Electronics. Nov. 2004. vol. 50, No. 4, pp. 1016-1025.

(Continued)

*Primary Examiner* — Marivelisse Santiago-Cordero
*Assistant Examiner* — Issam Chakour
(74) *Attorney, Agent, or Firm* — Ladas & Parry LLP

(57) ABSTRACT

Provided is an apparatus and method for detecting a packet in a Wireless Local Area Network (WLAN) which can reduce a processing time of packet detection based on Orthogonal Frequency Division Multiplexing (OFDM) by detecting a received packet employing symmetry of a short preamble. The packet detecting apparatus includes an autocorrelation average power calculation unit for calculating an absolute value of an autocorrelation average power value obtained by delaying a preamble signal of a received signal by half of a preamble length, an average power calculation unit for calculating an average power value of the received signal, a power ratio calculation unit for calculating a ratio of the average power value to the absolute value of the average power value, and a packet detection unit for detecting the packet by using the power ratio calculated by the power ratio calculation unit.

8 Claims, 6 Drawing Sheets

U.S. PATENT DOCUMENTS

| | | |
|---|---|---|
| 2006/0050800 A1 | 3/2006 | Aytur et al. |
| 2006/0104393 A1 | 5/2006 | DiRenzo et al. |
| 2006/0126766 A1* | 6/2006 | Kang et al. .................... 375/343 |
| 2007/0291632 A1* | 12/2007 | Li et al. ......................... 370/203 |

FOREIGN PATENT DOCUMENTS

| | | |
|---|---|---|
| KR | 1020040039510 | 5/2004 |
| KR | 1020050063590 | 6/2005 |
| KR | 1020060065870 | 6/2006 |

OTHER PUBLICATIONS

KIPO Notice of Patent Grant dated Apr. 15, 2008 for the corresponding application KR 10-2006-0096170.

LAN/MAN Standards Committee of the IEEE Computer Society; "IEEE 802, Part 11: Wireless Lan Medium Access Control (MAC) and Physical Layer (PHY) Specifications: High Speed Physical Layer in the 5 GHz Band", Supplement to IEEE Standard for Information Technology, Published Dec. 30, 1999, 90 pages.

* cited by examiner

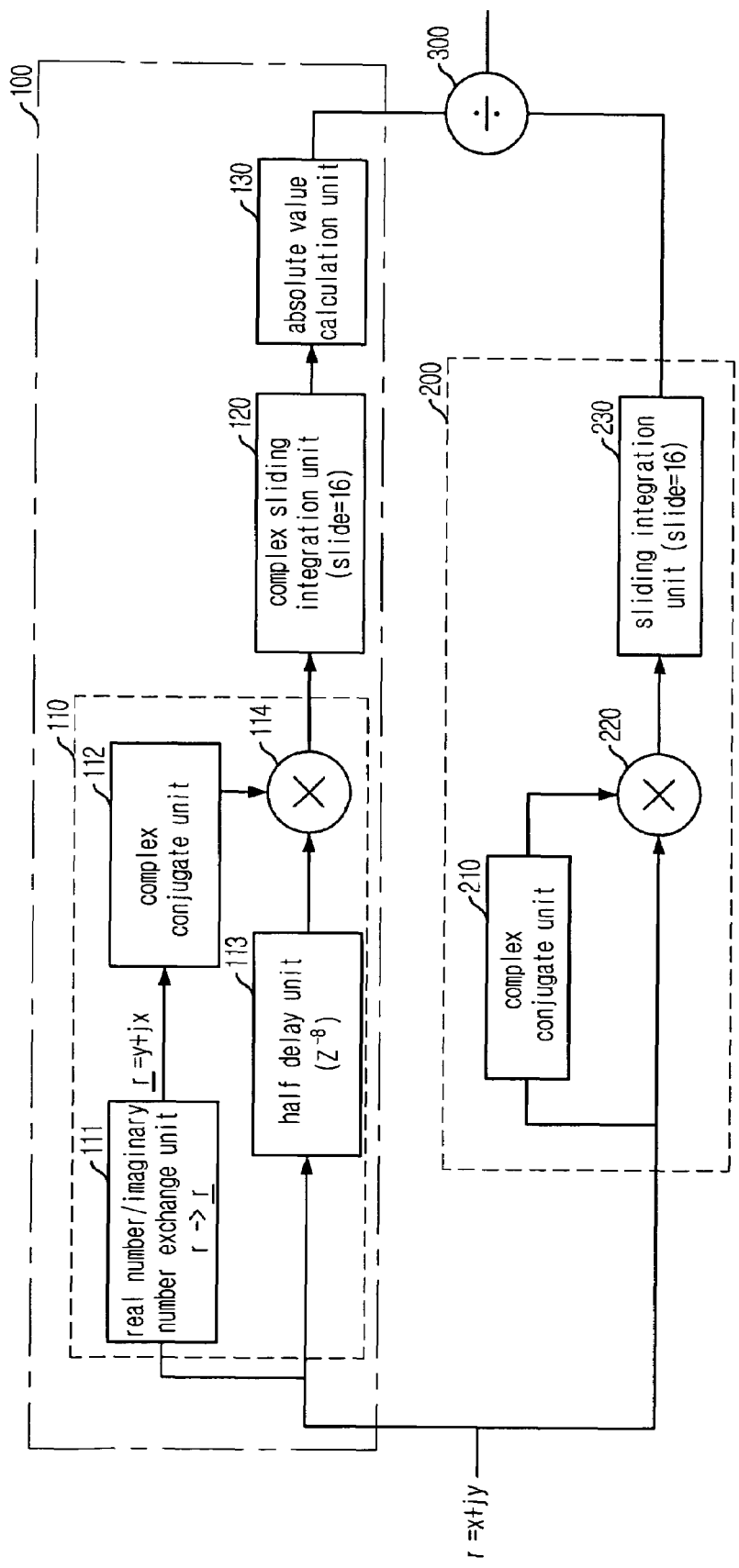

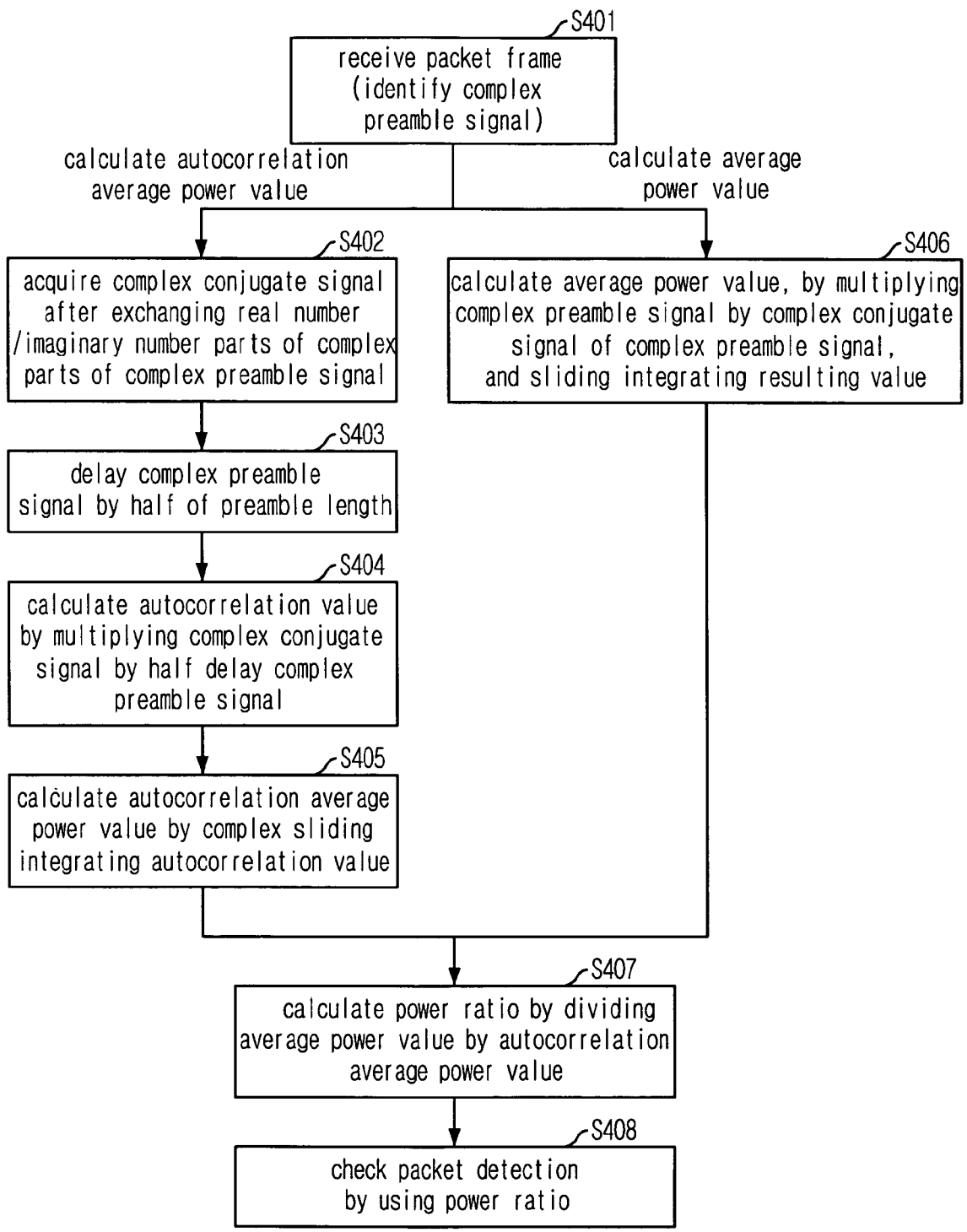

APPARATUS AND METHOD FOR DETECTING PACKET IN WIRELESS LAN BASED ON ORTHOGONAL FREQUENCY DIVISION MULTIPLEXING

FIELD OF THE INVENTION

The present invention relates to an apparatus and method for detecting a packet in a Wireless Local Area Network (WLAN) based on Orthogonal Frequency Division Multiplexing (OFDM); and, more particularly, to an apparatus and method for detecting a packet in a WLAN based on OFDM which can reduce a processing time of packet detection by detecting a received packet employing symmetry of a short preamble.

DESCRIPTION OF RELATED ART

Recently, high speed data communication using a WLAN is widely utilized. This is because flexibility in network configuration, easy network connection and mobility which have not been provided by general wire communication can be attained at a low cost by using the WLAN.

The WLAN has been developed and used under IEEE 802.11 standard, and is generally classified into three types depending on a frequency band and a data transmission rate.

Based on the frequency band, the WLAN is divided into 802.11b and 802.11g using 2.4 GHz frequency band, and 802.11a using 5 GHz frequency band.

In these standards, 802.11b provides one data transmission rate among 1/2/5.5/11 Mbps, and performs modulation by a spread spectrum. 802.11g provides the maximum data transmission rate up to 54 Mbps to compensate for the maximum data transmission rate 11 Mbps of 802.11b, and offers one data transmission rate among 6/9/12/18/24/36/48/54 Mbps. 802.11g performs modulation based on the OFDM. 802.11a provides one data transmission rate among 6/9/12/18/24/36/48/54 Mbps, and performs modulation based on the OFDM.

Among the above standards, 802.11g and 802.11a perform modulation based on the OFDM. The wireless communication based on the OFDM follows the standard defined in the "IEEE 802, PART 11: WIRELESS LAN MEDIUM ACCESS CONTROL (MAC) AND PHYSICAL LAYER (PHY) SPECIFICATIONS: HIGH SPEED PHYSICAL LAYER IN THE 5 GHz BAND."

On the other hand, the WLAN based on the OFDM adopts various modulation techniques to support diverse data transmission rates. That is, the WLAN based on the OFDM employs Binary Phase Shift Keying (BPSK) for 6/9 Mbps, Quadrature Phase Shift Keying (QPSK) for 12/18 Mbps, 16 Quadrature Amplitude Modulation (16 QAM) for 24/36 Mbps, and 64 QAM for 48/56 Mbps.

In general, the conventional. WLAN based on the OFDM uses the following packet frame.

FIG. 1 is a view illustrating a structure of a packet frame used in the conventional WLAN based on the FDM.

Referring to FIG. 1, the packet frame includes a short preamble, a long preamble, a signal field and a data field.

The short preamble is constituted by 10 fields S0 to S9 for signal detection, Automatic Gain Control (AGC), synchronization and coarse frequency offset estimation. In other words, the short preamble is composed of a frame for AGC and diversity selection in S0 to S3, a frame for signal detection in S4 to S6, and a frame for coarse frequency offset estimation and time synchronization in S7 to S9.

The long preamble is composed of two fields for channel correction and fine frequency offset estimation. The signal field contains information such as a data speed and a data length of a transmitted packet frame. The data field contains data information.

Meanwhile, a receiving end of the WLAN for receiving the packet frame receives a signal distorted by multi-path fading over a wireless channel, and performs a detecting operation of detecting the distorted signal and a synchronizing operation of recovering the received signal. In this data transmission, the WLAN which is a kind of packet-switched network does not consecutively transmit data but transmits packet-type data in a wanted time. Therefore, for high speed data transmission, the received signal should be detected and then synchronized within a short time.

The following is a description of a conventional method for detecting a packet in the WLAN.

First of all, the simplest method for detecting the packet in the WLAN is a method for measuring energy of a received packet.

The above method takes advantage of the fact that energy received in a packet absence time is almost a noise level and that energy increases in a packet existence time. That is, this method detects energy in the packet existence time, and decides the existence of the packet when the energy exceeds a preset threshold value.

However, this method has a disadvantage that the threshold value for deciding the existence of the packet is dependent upon the input energy. Namely, the energy of the packet is not always constantly inputted. Also, the existence of the inputted packet cannot be decided by one threshold value due to adjacent channels, amplifier gain setting, wireless interference, etc. For example, if the inputted energy is slightly higher than the noise level, the threshold value must be set small. Conversely, if the inputted energy is much higher than the noise level, the threshold value must be set large.

In order to solve the drawbacks of the above method, there has been suggested a method for detecting a packet in the WLAN by setting a ratio of a packet existence period to a packet absence period as a threshold value, instead of setting the threshold value according to the input energy. This method is not dependent upon the size of the energy. Now, the above method will be described in more detail with reference to FIG. 2A.

FIG. 2A is a view illustrating one example of the conventional method for detecting the packet in the WLAN.

As shown in FIG. 2A, this method sets two consecutive sliding windows A and B, calculates energy of each of the sliding windows A and B, and uses an energy ratio as a threshold value. The threshold value is represented by the following:

$$\text{Threshold value} = \frac{\text{Energy of sliding window } A}{\text{Energy of sliding window } B} \qquad \text{Eq. 1}$$

When not a packet but noise level energy is inputted to the sliding window A and the sliding window B as shown in FIG. 2A, any packet does not exist therein and the noise level energy is inputted. Accordingly, the threshold value which is the ratio of the energy of the sliding window A to the energy of the sliding window B is constant.

However, as shown in FIG. 2A, when a packet is inputted to the sliding window A and noise level energy is inputted to the sliding window B, the packet exists in the sliding window A and thus the energy increases, while the noise level energy is constant in the sliding window B. Therefore, the threshold value which is the ratio of the energy of the sliding window A to the energy of the sliding window B increases.

Thereafter, when a packet is inputted to the sliding window A and the sliding window B, the energy of the sliding window A is almost identical to the energy of the sliding window B. As a result, the threshold value which is the energy ratio becomes constant.

There is another example of the conventional method for detecting the packet in the WLAN in which the short preamble signal of the packet frame is repeatedly received, as shown in FIGS. 2B and 2C.

FIG. 2B is a view illustrating another example of the conventional method for detecting the packet in the WLAN, and FIG. 2C is an exemplary view illustrating periodicity of the short preamble used in FIG. 2B.

As depicted in FIG. 2C, the short preamble signal in the related art is obtained by performing Inverse Fast Fourier Transform (IFFT) on a complex signal of (0, 0, 1+j, 0, 0, 0, −1−j, 0, 0, 0, 1+j, 0, 0, 0, −1−j, 0, 0, 0, −1−j, 0, 0, 0, 1+j, 0, 0, 0, 0, 0, 0, −1−j, 0, 0, 0, −1−j, 0, 0, 0, 1+j, 0, 0, 0, 1+j, 0, 0, 0, 1+j, 0, 0, 0, 1+j, 0, 0). The short preamble signal is composed of a sequence of 16 samples in a time domain, wherein a sampling time is 1/20 MHz.

The above method takes advantage of the fact that the short preamble signal is repeatedly received 10 times at the starting stage of the WLAN frame. This method calculates a threshold value which is a ratio of an autocorrelation value Cn between a 16 samples-delayed signal and a current signal to an energy value Pn of an input signal by taking advantage of the fact that the short preamble is repeated every 16 samples. That is, the threshold value is represented as:

$$\text{Threshold value} = \frac{C_n}{P_n} \quad \text{Eq. 2}$$

In the above method, when the threshold value of Eq. 2 for detecting the received packet is set to 0.5, at least 24 samples are needed. To stably detect the packet in consideration of the wireless channel environment or noise, this method counts the number of continuous excesses of the threshold value, and decides the packet detection only when the counted value is over a predetermined value.

As described above, the method using the double sliding windows and the method using the periodicity of the short preamble are the representative methods for detecting the packet in the WLAN.

However, the conventional methods consume much time in detecting the packet and thus do not secure a sufficient time for the following synchronization requiring a long processing time. In other words, since the conventional methods use many short preambles for the packet detection or automatic gain control, they do not have a sufficient time for the frequency and time synchronization. As a result, the conventional methods cannot normally recover data due to inaccurate synchronization.

SUMMARY OF THE INVENTION

It is, therefore, an object of the present invention to provide an apparatus and method for detecting a packet in a WLAN based on OFDM which can reduce a processing time of packet detection by detecting a received packet employing symmetry of a short preamble.

In accordance with one aspect of the present invention, there is provided an apparatus for detecting a packet in a WLAN based on the OFDM, the apparatus including: an autocorrelation average power calculation unit for calculating an absolute value of an autocorrelation average power value obtained by delaying a preamble signal of a received signal by half of a preamble length; an average power calculation unit for calculating an average power value of the received signal; a power ratio calculation unit for calculating a ratio of the average power value calculated by the average power calculation unit to the absolute value of the average power value calculated by the autocorrelation average power calculation unit; and a packet detection unit for detecting the packet by using the power ratio calculated by the power ratio calculation unit.

In accordance with another aspect of the present invention, there is provided a method for detecting a packet in a WLAN based on OFDM, the method including the steps of: when a packet is received from outside, (a) calculating an autocorrelation value by delaying a complex preamble signal of the received packet by half of a preamble length; (b) calculating an autocorrelation average power value of the autocorrelation value calculated in the step (a) over the preamble length; (c) calculating an absolute value of the autocorrelation average power value calculated in the step (b); (d) calculating an average power value of the received packet over the preamble length; and (e) calculating a power ratio of the average power value to the absolute value of the autocorrelation average power value to detect the packet based on the calculated power ratio.

The other objectives and advantages of the invention will be understood by the following description and will also be appreciated by the embodiments of the invention more clearly. Further, the objectives and advantages of the invention will readily be seen that they can be realized by the means and its combination specified in the claims.

BRIEF DESCRIPTION OF THE DRAWINGS

The above and other objects and features of the instant invention will become apparent from the following description of preferred embodiments taken in conjunction with the accompanying drawings, in which:

FIG. 4 is a block diagram illustrating an apparatus for detecting a packet in a WLAN based on OFDM in accordance with a preferred embodiment of the present invention; and FIG. 5 is a flowchart illustrating a method for detecting a packet in a WLAN based on OFDM in accordance with another embodiment of the present invention.

DETAILED DESCRIPTION OF THE INVENTION

The above-mentioned objectives, features, and advantages will be more apparent by the following detailed description associated with the accompanying drawings, and thus, a person skilled in the art will easily carry out the invention. Further, in the following description, well-known arts will not be described in detail if it seems that they could obscure the invention in unnecessary detail. Hereinafter, preferred embodiments of the present invention will be set forth in detail with reference to the accompanying drawings.

Figure 1:
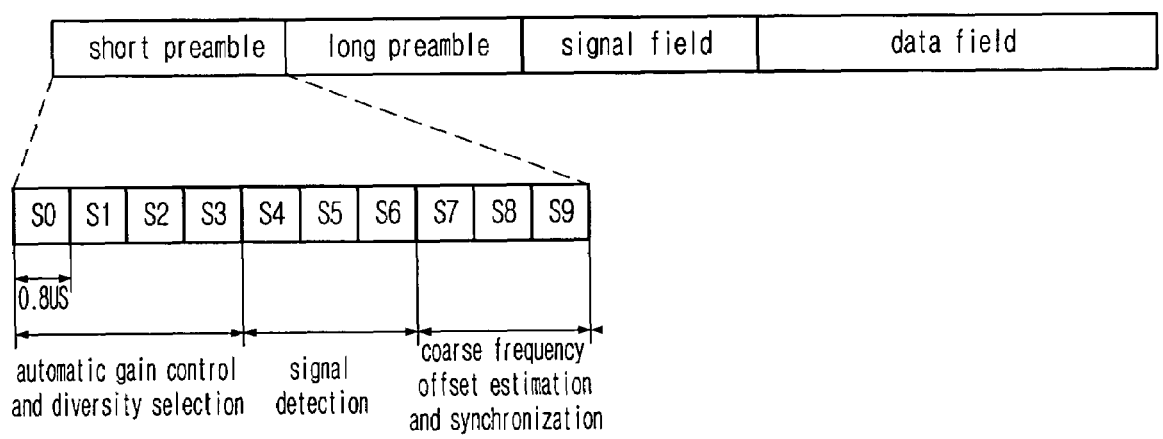
FIG. 1 is a view illustrating a structure of a packet frame used in a conventional WLAN based on OFDM.
Figure 2A:
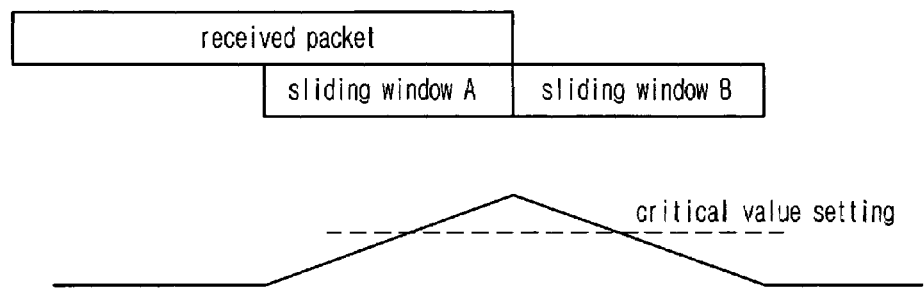
FIG. 2A is a view illustrating one example of a conventional method for detecting a packet in a WLAN.
Figure 2B:
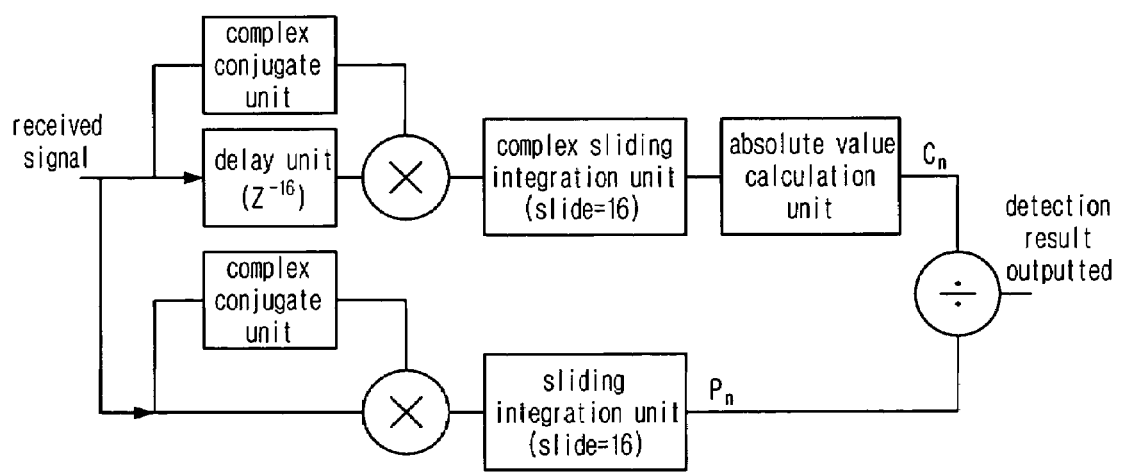
FIG. 2B is a view illustrating another example of a conventional method for detecting a packet in a WLAN.
Figure 2C:
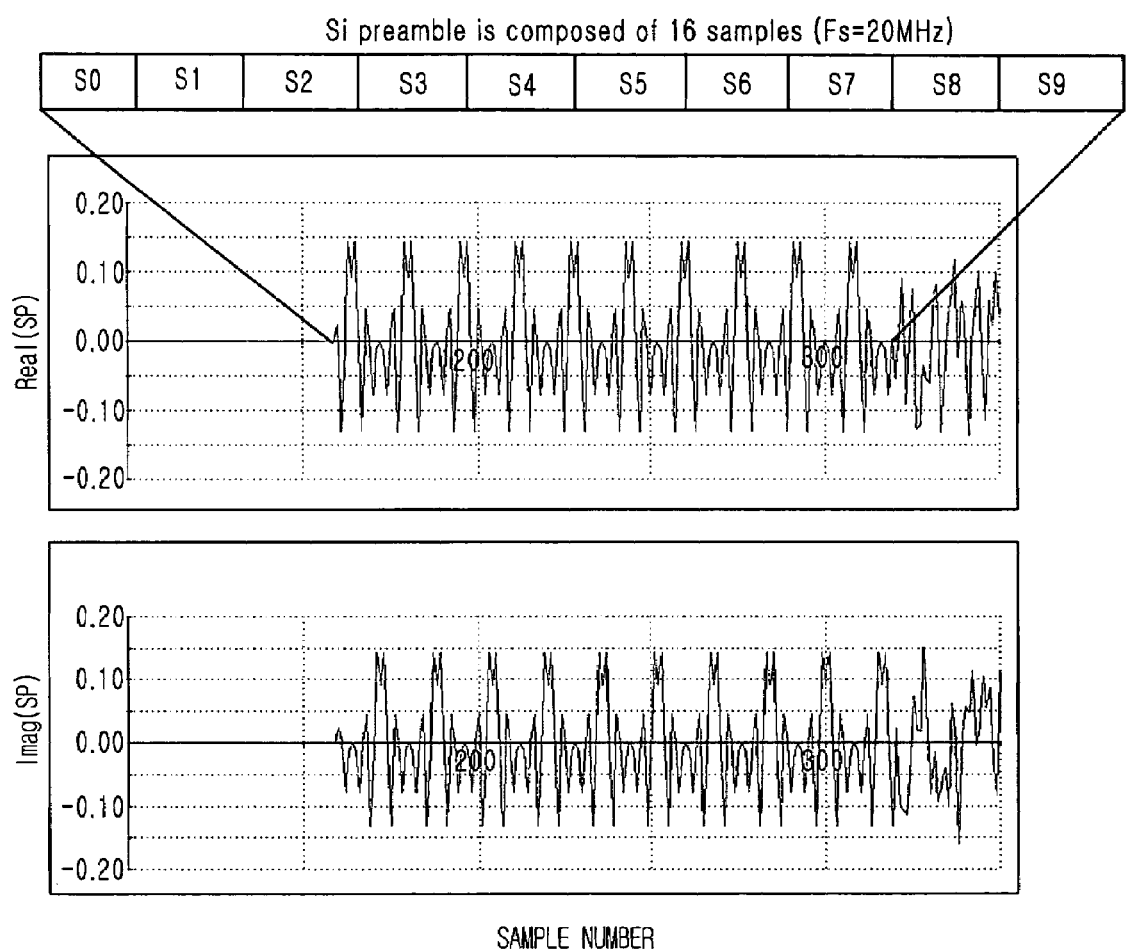
FIG. 2C is an exemplary view illustrating periodicity of a short preamble used in FIG. 2B.
Figure 3:
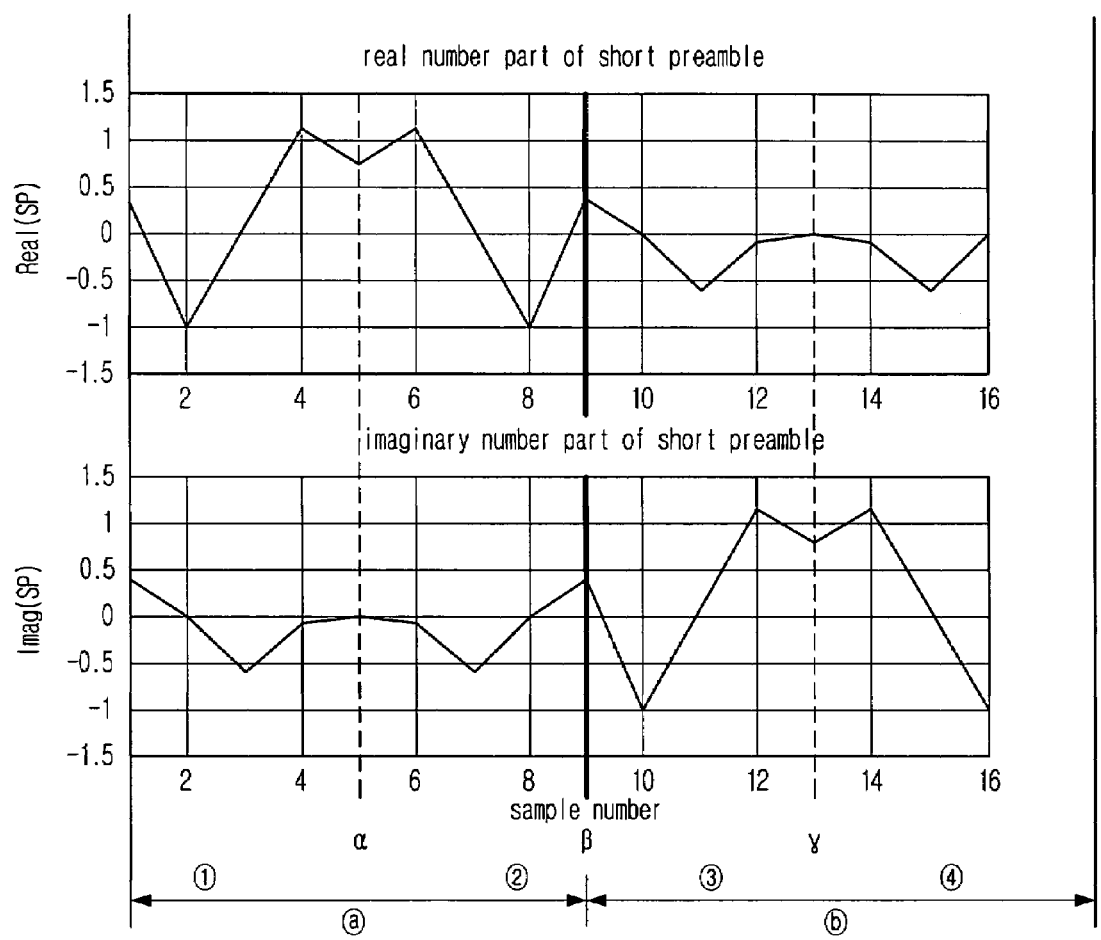
FIG. 3 is a view illustrating symmetry of a short preamble in OFDM to which the present invention is applied.

FIG. 3 is a view illustrating symmetry of a short preamble in OFDM to which the present invention is applied.

As shown in FIG. 3, when 16 samples of the short preamble are observed, the short preamble in the OFDM to which the present invention is applied has two types of symmetry.

In detail, in FIG. 3, when a real number part and an imaginary number part of the short preamble are divided into two parts ⓐ and ⓑ, individually, and the ⓐ parts are divided into ① and ② and the ⓑ parts are divided into ③ and ④, individually, it can be seen that there are two types of symmetry of the short preamble. That is, ① and ② parts of ⓐ parts are symmetrical with respect to a dotted line α, and ③ and ④ parts of ⓑ parts are symmetrical with respect to a dotted line γ. In addition, ⓐ and ⓑ parts are symmetrical with respect to a solid line β such that the real number part and the imaginary number part have opposite values. For example, if ⓐ part is x+jy, ⓑ part becomes y+jx.

The symmetry of the short preamble may be represented as:

$$C\left(n+\frac{L}{2}\right)=\overline{C(n)}=y(n)+jx(n)\mid_{n=0,1,2,\ldots,7} \quad \text{Eq. 3}$$

$$C\left(\frac{L}{4}+m\right)=C\left(\frac{L}{4}-m\right)_{m=1,2,3} \quad \text{Eq. 4}$$

$$C\left(m+\frac{3 \cdot L}{4}\right)=C\left(\frac{3 \cdot L}{4}-m\right)_{m=1,2,3} \quad \text{Eq. 5}$$

where C(n) denotes a complex preamble value of x(n)+jy(n) type short preamble; $\overline{C(n)}$ denotes a complex preamble value of y(n)+jx(n) type short preamble which represents that a real number part and an imaginary number part of C(n) are exchanged; and L denotes a length of a short preamble. Herein, L means 16 samples.

In the above equations, Eq. 3 represents the relation between ⓐ and ⓑ parts of FIG. 3, Eq. 4 represents the relation between ① and ② parts of FIG. 3, and Eq. 5 represents the relation between ③ and ④ parts of FIG. 3.

Especially, as shown in Eq. 3, when the real number values and the imaginary number values of the first 8 samples are exchanged among the 16 samples of the short preamble, themselves and the real number values and the imaginary number values of the rest 8 samples become symmetrical. This symmetry of the short preamble is referred to as "complex half delay symmetry." That is, in FIG. 3, when the real number values of the first 8 samples are x(n) and the imaginary number values thereof are y(n), the real number values of the rest 8 samples are y(n) and the imaginary number values thereof are x(n).

FIG. 4 is a block diagram illustrating an apparatus for detecting a packet in a WLAN based on the OFDM (hereinafter, which will be referred to as "the apparatus for detecting the packet") in accordance with a preferred embodiment of the present invention.

Referring to FIG. 4, the apparatus for detecting the packet includes an autocorrelation average power unit 100, an average power unit 200 and a power ratio calculation unit 300.

The autocorrelation average power unit 100 calculates an autocorrelation average power value of a complex preamble signal by using the complex half delay symmetry, namely, a property that the first 8 samples of a real number part of a preamble of a received input signal are identical to the rest 8 samples of an imaginary part thereof.

The autocorrelation average power unit 100 is provided with a half delay autocorrelation unit 110, a complex sliding integration unit 120 and an absolute value calculation unit 130.

The half delay autocorrelation unit 110 calculates an average power value with respect to an autocorrelation value by using the complex half delay symmetry. In other words, the half delay autocorrelation unit 110 calculates an average power value over the complex preamble length, i.e., 16 samples, with respect to the autocorrelation value between a complex preamble signal and a signal obtained by half-delaying the complex preamble signal, that is, by delaying it by 8 samples. For this, the half delay autocorrelation unit 110 has a real number/imaginary number exchange unit 111, a complex conjugate unit 112, a half delay unit 113 and a multiplier 114.

The real number/imaginary number exchange unit 111 exchanges a real number part and an imaginary number part of the complex preamble signal. That is, the real number/imaginary number exchange unit 111 transforms the complex preamble signal r=x+jy into $\bar{r}$=y+jx by exchanging the real number part and the imaginary number part thereof.

The complex conjugate unit 112 acquires a complex conjugate of the complex preamble signal whose real number part and imaginary number part have been exchanged by the real number/imaginary number exchange unit 111. Namely, the complex conjugate unit 112 acquires the complex conjugate $$\bar{r}^* = y - jx$$

of the complex preamble signal $\bar{r}$=y+jx transmitted from the real number/imaginary number exchange unit 111.

The half delay unit 113 half-delays the complex preamble signal to calculate the autocorrelation value by half-delaying the complex preamble signal, namely, by delaying it by 8 samples, in the preamble length of 16 samples.

The multiplier 114 outputs an autocorrelation value by multiplying the result of the complex conjugate unit 112 by the result of the half delay unit 113.

The following is a detailed description of the complex sliding integration unit 120 and the absolute value calculation unit 130 for calculating an average power value of the autocorrelation value outputted from the half delay autocorrelation unit 110.

The complex sliding integration unit 120 calculates the average power value over the 16 samples with respect to the 8 sample autocorrelation values outputted from the half delay autocorrelation unit 110.

The absolute value calculation unit 130 calculates an absolute value of the average power value calculated by the complex sliding integration unit 120.

Now, the average power unit 200 and the power ratio calculation unit 300 which are other elements of the apparatus for detecting the packet will be described in detail.

The average power unit 200 calculates an average power of the received signal. For this, the average power unit 200 is provided with a complex conjugate unit 210, a multiplier 220 and a sliding integration unit 230. That is, the complex conjugate unit 210 acquires a complex conjugate signal r*=x−jy of the complex preamble signal r=x+jy. The multiplier 220 multiplies the complex conjugate signal r*=x−jy of the complex preamble signal acquired by the complex conjugate unit 210 by the complex preamble signal r=x+jy which is the original signal to calculate an instantaneous power value. The sliding integration unit 230 calculates an average power value of the instantaneous power value outputted from the multiplier 220 in the complex preamble length of 16 samples.

The power ratio calculation unit 300 calculates a power ratio by dividing the average power value calculated by the average power unit 200 by the autocorrelation average power value calculated by the autocorrelation average power unit 100.

FIG. 5 is a flowchart describing a method for detecting a packet in the WLAN based on the OFDM in accordance with another embodiment of the present invention.

According to the packet detecting process of the present invention shown in FIG. 5, a packet frame is received over a multi-path wireless channel, and a short preamble, namely, a complex preamble signal is identified in step S401.

Thereafter, a complex conjugate signal is acquired after exchanging real number/imaginary number parts of the complex preamble signal in step S402. At the same time, the complex preamble signal is delayed by half of the preamble length in step S403. In a following step S404, an autocorrelation value is calculated by multiplying the complex conjugate signal acquired in step S402 by the half delay complex preamble signal delayed in step S403.

Next, an autocorrelation average power value is calculated by performing complex sliding integration on the autocorrelation value in step S405.

In the meantime, an average power value is calculated by multiplying the complex preamble signal by the complex conjugate signal acquired from the complex preamble signal, and then sliding integrating the resulting value is calculated in step S406.

In a subsequent step S407, the packet detecting apparatus calculates a power ratio by dividing the average power value calculated in step S406 by the autocorrelation average power value calculated in step S405. Finally, it is identified whether the packet is detected by using the power ratio in step S408.

As discussed earlier, a packet can be rapidly detected by using a relatively small number of short preambles employing the symmetry of a short preamble signal in a WLAN based on an OFDM.

In addition, a sufficient processing time for synchronization upon reception is secured by using the relatively small number of short preambles, thereby improving accuracy of the synchronization.

The method of the present invention as mentioned above may be implemented by a software program that is stored in a computer-readable storage medium such as CD-ROM, RAM, ROM, floppy disk, hard disk, optical magnetic disk, or the like. This process may be readily carried out by those skilled in the art; and therefore, details of thereof are omitted here.

The present application contains subject matter related to Korean patent application No. 2006-0096170, filed with the Korean Intellectual Property Office on Sep. 29, 2006, the entire contents of which are incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. An apparatus for detecting a packet in a Wireless Local Area Network (WLAN) based on Orthogonal Frequency Division Multiplexing (OFDM), the apparatus comprising:
an autocorrelation average power calculation means for calculating an absolute value of an autocorrelation average power value obtained by delaying a preamble signal of a received signal by half of a preamble length,
wherein the preamble signal is configured to have at least 2 or more samples, and
wherein the delay of half of the preamble length is configure to be applied immediately after receiving a first sample of the preamble signal from the received signal;
an average power calculation means for calculating an average power value of the received signal;
a power ratio calculation means for calculating a ratio of the average power value calculated by the average power calculation means to the absolute value of the average power value calculated by the autocorrelation average power calculation means; and
a packet detection means for detecting the packet by using the power ratio calculated by the power ratio calculation means.

2. The apparatus as recited in claim 1, wherein the autocorrelation average power calculation means includes:
a real number part/imaginary number part exchange means for exchanging a real number part and an imaginary number part of a complex preamble signal of the received signal;
a complex conjugate means for acquiring a complex conjugate signal of the signal transmitted from the real number part/imaginary number part exchange means;
a half delay means for delaying the complex preamble signal by half of the preamble length;
a multiplying means for multiplying the value received from the complex conjugate means by the value received from the half delay means to provide an autocorrelation value;
a sliding integration means for calculating an average power value of the autocorrelation value outputted from the multiplying means over the preamble length; and
an absolute value calculation means for calculating an absolute value of the average power value outputted from the sliding integration means to supply the absolute value to the power ratio calculation means.

3. The apparatus as recited in claim 1, wherein the average power calculation means includes:
a complex conjugate means for acquiring a complex conjugate of the complex preamble signal of the received signal;
a multiplying means for multiplying the received signal by the complex conjugate signal received from the complex conjugate means; and
a sliding integration means for calculating an average power value of the signal outputted from the multiplying means over the preamble length.

4. An apparatus for detecting a packet in a Wireless Local Area Network (WLAN) based on Orthogonal Frequency Division Multiplexing (OFDM), the apparatus comprising:
an autocorrelation average power calculation means for calculating an absolute value of an autocorrelation average power value obtained by delaying a preamble signal of a received signal by half of a preamble length;
an average power calculation means for calculating an average power value of the received signal;
a power ratio calculation means for calculating a ratio of the average power value calculated by the average power calculation means to the absolute value of the average power value calculated by the autocorrelation average power calculation means; and
a packet detection means for detecting the packet by using the power ratio calculated by the power ratio calculation means, wherein, when a real number part and an imaginary number part of the complex preamble are exchanged in the first half preamble length, the complex preamble signal is a complex preamble signal of the second half of the preamble length.

5. A method for detecting a packet in a WLAN based on OFDM, the method comprising the steps of:
(a) when a packet is received from outside, calculating an autocorrelation value by delaying a complex preamble signal of the received packet by half of a preamble length,
wherein the complex preamble signal is configured to have at least 2 or more samples, and
wherein the delay of half of the preamble length is configure to be applied immediately after receiving a first sample of the complex preamble signal from the received packet;
(b) calculating an autocorrelation average power value of the autocorrelation value calculated in the step (a) over the preamble length;
(c) calculating an absolute value of the autocorrelation average power value calculated in the step (b);
(d) calculating an average power value of the received packet over the preamble length; and
(e) calculating a power ratio of the average power value to the absolute value of the autocorrelation average power value to detect the packet based on the calculated power ratio.

6. The method as recited in claim 5, wherein, in the step (a), the autocorrelation value is calculated by multiplying a complex conjugate signal acquired by exchanging a real number part and an imaginary number part of the complex preamble signal of the received packet by a signal acquired by delaying the complex preamble signal by half of the preamble length.

7. The method as recited in claim 5, wherein, in the step (d), the average power value is calculated by multiplying the received packet by the complex conjugate signal of the received packet over the preamble length.

8. A method for detecting a packet in a WLAN based on OFDM, the method comprising the steps of:
(a) when a packet Is received from outside, calculating an autocorrelation value by delaying a complex preamble signal of the received packet by half of a preamble length;
(b) calculating an autocorrelation average power value of the autocorrelation value calculated in the step (a) over the preamble length:
(c) calculating an absolute value of the autocorrelation average power value calculated in the step (b);
(d) calculating an average power value of the received packet over the preamble length; and
(e) calculating a power ratio of the average power value to the absolute value of the autocorrelatlon average power value to detect the packet based on the calculated power ratio,
wherein, when a real number part and an imaginary number part of the complex preamble are exchanged in the first half preamble length, the complex preamble signal is a complex preamble signal in the second half of the preamble length.

* * * * *